United States Patent
Marque-Pucheu et al.

(10) Patent No.: US 9,451,562 B2
(45) Date of Patent: Sep. 20, 2016

(54) MATCHING SUBCARRIER POWER IN A BROADBAND NETWORK COLLOCATED WITH A NARROWBAND NETWORK

(75) Inventors: Gerard Marque-Pucheu, Verneuil (FR); Christophe Gruet, Montigny le Brettoneux (FR); Vincent Seguy, Boulogne Billancourt (FR)

(73) Assignee: CASSIDIAN SAS, Elancourt (FR)

( * ) Notice: Subject to any disclaimer, the term of this patent is extended or adjusted under 35 U.S.C. 154(b) by 530 days.

(21) Appl. No.: 14/004,162

(22) PCT Filed: Mar. 9, 2012

(86) PCT No.: PCT/EP2012/054094
§ 371 (c)(1),
(2), (4) Date: Sep. 9, 2013

(87) PCT Pub. No.: WO2012/120113
PCT Pub. Date: Sep. 13, 2012

(65) Prior Publication Data
US 2014/0004845 A1   Jan. 2, 2014

(30) Foreign Application Priority Data

Mar. 10, 2011 (FR) ...................... 11 51994

(51) Int. Cl.
| | | |
|---|---|---|
| *H04W 4/00* | (2009.01) | |
| *H04W 52/34* | (2009.01) | |
| *H04W 52/24* | (2009.01) | |
| *H04W 28/04* | (2009.01) | |
| *H04W 28/16* | (2009.01) | |
| *H04W 28/18* | (2009.01) | |

(52) U.S. Cl.
CPC ........... *H04W 52/34* (2013.01); *H04W 52/243* (2013.01); *H04W 52/244* (2013.01); *H04W 28/048* (2013.01); *H04W 28/16* (2013.01); *H04W 28/18* (2013.01)

(58) Field of Classification Search
CPC ... H04W 88/02; H04W 84/18; H04W 24/00; H04W 88/06; H04W 16/14; H04W 72/04; H04W 52/24; H04W 28/04; H04W 84/08; H04W 52/34; H04W 52/243; H04W 52/244; H04W 28/048; H04W 28/16; H04W 28/18; H04W 48/18; H04W 72/0453; H04W 16/04; H04W 16/10; H04W 72/082; H04L 1/0026; H04L 47/10; H04L 12/413; H04L 29/06; H04L 5/06; H04B 1/69
USPC ........... 455/422.1, 41.2, 67.13, 67.11, 553.1, 455/550.1, 557, 552.1, 63.1, 450, 522; 370/252, 310, 445, 329, 341, 431
See application file for complete search history.

(56) References Cited

PUBLICATIONS

Hulkkonen WO_2009-068727 A1.pdf.*

*Primary Examiner* — Charles Appiah
*Assistant Examiner* — Alexander Yi
(74) *Attorney, Agent, or Firm* — Steven M. Greenberg, Esq.; CRGO Law

(57) ABSTRACT

A first broadband network divided into sectors and a second narrowband network have collocated cells and a common wide frequency band. The interference produced by the first network on the second network is reduced for a carrier to interference ratio threshold allowable at the reception in the second network. For example, a base station ($BS_{BB,nc}$) in a given cell ($C_{BB,nc}$) of the first network attenuates by an attenuation parameter the emission power of each subcarrier which is adjacent to a carrier of one of the groups allocated to preselected cells ($C_{NB,i}$) of the second network in a sector ($S_{ns}$) of the given cell and on levels ($L_0$ to $L_{I-1}$) starting from the given cell ($C_{BB,nc}$). The attenuation parameter is low for a level close to the given cell.

12 Claims, 6 Drawing Sheets

MATCHING SUBCARRIER POWER IN A BROADBAND NETWORK COLLOCATED WITH A NARROWBAND NETWORK

CROSS-REFERENCE TO RELATED APPLICATIONS

This application is a §371 national phase entry of International Application No. PCT/EP2012/054094, filed Mar. 9, 2012, which claims priority to French Patent Application No. 1151994, filed Mar. 10, 2011.

The present invention relates to a method for adapting subcarrier powers transmitted in a predetermined transmission direction in a broadband cellular wireless communication network as a function of the carrier powers transmitted in the broad band in the predetermined transmission direction in a narrowband cellular wireless communication network collocated with the broadband network.

The predetermined transmission direction in the networks can be according to downlinks from base stations to mobiles, or also according to uplinks from mobiles to base stations. As is known, mobiles are also known as "mobile stations", "user equipment", or "mobile terminals".

The broadband network is a network for third generation 3GPP (Third Generation Partnership Project) mobiles based for example on the E-UTRA (Evolved-UMTS Terrestrial Radio Access) technology, sometimes also known as LTE (Long Term Evolution), or on the mobile WiMAX (Worldwide Interoperability for Microwave Access) technology. Each cell in the broadband network comprises a base station which can have several directional sectors in each of which subcarriers distributed in all of a common frequency band reserved for the downlinks can be emitted by the base station, and in each of which other subcarriers in all of another common frequency band reserved for the uplinks can be emitted by mobiles.

The narrowband network is for example a narrowband professional private terrestrial wireless communication network PMR (Professional Mobile Radio) for example of the DMR (Digital Mobile Radio), TETRA (Terrestrial Trunked Radio), TETRAPOL or P25 type. The narrow band network is structured in a cellular pattern of re-use of several cells each having an omnidirectional base station. Interlaced groups of carriers distributed in the frequency band reserved for the downlinks are allocated respectively to the cells of a pattern. Moreover, other interlaced groups of carriers distributed in the frequency band reserved for the uplinks are allocated respectively to the cells of a pattern.

These two networks are collocated, which means that the cells are common to the networks and each cell comprises a base station of the broadband network and a base station of the narrowband network.

On the one hand, the proximity of the subcarriers and carriers in the broadband reserved for the downlinks or uplinks allocated to the two networks, and on the other hand the collocation of the base stations of the two networks in the cells produce interference detrimental to the reception in the mobiles and the base stations and on the quality of service of the wireless communications in the networks. High interference in the cells of the narrowband network cannot be allowed because of the high quality of service required for the communications in the narrowband network. Consequently the transmissions in the broadband network must be adapted to the conditions of exploitation of the narrowband network.

A simple solution would be to prevent, in a base station of the broadband network, the transmission of subcarriers interfering substantially with carriers transmitted by base stations of the narrow band network situated in the proximity of the base station of the broadband network, and to prevent, in a mobile of the broadband network, the transmission of subcarriers interfering substantially with carriers transmitted by mobiles of the narrowband network situated in the proximity of the mobile of the broadband network. Such a solution considerably reduces the useful band of the broadband network.

The object of the invention is to reduce the interference produced by a broadband network divided into sectors on a narrowband network collocated with the broadband network for an allowable carrier to interference ratio threshold with reception in a cell of the narrowband network.

To this end, a method for adapting subcarrier powers in a first cellular wireless communication network having first base stations with several directional sectors as a function of the powers of carriers in a second cellular wireless communication network having second omnidirectional base stations, the first and second networks having in common cells each having first and second collocated base stations and a wide frequency band including the subcarriers allocated to the sectors of the first base stations and groups of carriers allocated respectively to the second base stations in a cellular pattern of re-use of the second network having several concentric levels of cell location, is characterised in that it comprises an attenuation by an attenuation parameter of a predetermined power for each subcarrier which is to be transmitted by a transmitter/receiver (of the first network located in a given cell and in) a specified sector of the given cell and which is adjacent to a carrier belonging to one of the groups allocated to second base stations in preselected cells in the specified sector and on levels starting from the given cell below a predetermined high level, the attenuation parameter being all the more low as the respective level is close to the given cell, the subcarriers other than said adjacent subcarriers being for transmission with the predetermined transmission power in the specified sector by the transmitter/receiver.

A subcarrier to be transmitted is considered as adjacent to a carrier when the carrier is comprised in a sub-band of predetermined width centred on the subcarrier. For example, the second base stations of the second network of the narrowband type respectively transmit carriers comprised in the sub-band of predetermined width, with one carrier per second base station. Conversely, a subcarrier to be transmitted may be considered as adjacent to a carrier when the subcarrier is comprised in the useful frequency band centred on the subcarrier. For example, at least two first base stations of the first network of the broadband type respectively transmit subcarriers comprised in the useful frequency band of a carrier allocated to a second base station.

The transmitter/receiver of the first network may be a network base station when the wide frequency band is relative to a direction of transmission for downlinks from the base station to mobiles attached to the base station, or also a mobile when the wide frequency band is relative to a direction of transmission for uplinks from the mobiles to the base station.

According to the invention the transmitter/receiver itself decides on the transmission power of each of the subcarriers. Because of the attenuation of the transmission powers of the subcarriers in the transmitter/receiver of the first network which is selective as a function of the location of the second base stations with respect to the specified sector of the given cell containing the transmitter/receiver, the interference produced by the first broadband network on the second network of the narrowband type are reduced, whilst admitting as many subcarriers as possible with the predetermined transmission power in the first network. The division of cells in the first network into sectors makes it possible to increase the carrier to interference ratio in the cells of the second network and hence to reduce the interference caused by the first network in the second network.

The groups of subcarriers allocated to the second base stations may be associated with the attenuation parameters in a fixed manner independently of the range of transmitter/receivers in a chosen direction of transmission in the cells and of the traffic in these transmitter/receivers.

According to a particular embodiment, the groups of carriers allocated to the second base stations are associated in a dynamic manner with the attenuation parameters in order to adapt the powers of the subcarriers to the range of transmitter/receivers of the second network in a chosen direction of transmission in the cells. To this end, the method can comprise a measurement of reception powers of the carriers of the groups allocated to the second base stations of preselected cells in the specified sector of the given cell at a point situated in the given cell and in the specified sector, and a classification of the carriers into classes associated respectively with the levels, with the attenuation parameters and with thresholds which are all the more low as the associated levels are distanced from the given cell, the carriers in a class having reception powers comprised between the threshold associated with the class and the preceding threshold, the predetermined power for a subcarrier which is to be transmitted by the transmitter/receiver being attenuated by an attenuation parameter when the subcarrier is adjacent to a carrier belonging to the class associated with the attenuation parameter.

The measured reception power of a carrier may be the average reception power of active traffic routes supported by the second carrier in order to adapt the transmission powers of the subcarriers to the traffic load of the second network.

According to another variant, the measured reception power of each carrier of a group allocated to a second base station of a preselected cell in the specified sector can be the average of the measured reception powers for all the carriers belonging to the group. In particular, the measured reception power of each carrier of such a group may be the reception power of a control channel supported by one of the carriers of the group.

In order that interference produced by the first broadband network on the second network of the narrowband type is allowable in the second network, a target attenuation parameter of the carrier to interference ratio at the reception of carriers in a transmitter/receiver located in a cell of the second network is defined. In these cases, the attenuation parameters depend upon the target attenuation parameter. According to a particular embodiment, the attenuation parameter for a subcarrier adjacent to a carrier belonging to a group allocated to second base stations in preselected cells located on a respective level is $\alpha_i = k \, D_i^\gamma / D_{NB}^\gamma$. k designates a factor which is a function of the target attenuation parameter and of numbers of preselected located cells located respectively on the levels lower than the predetermined high level starting from the given cell. $D^i$ designates an average distance between a first base station and points of preselected cells on the respective level which are furthest from the given cell. $D_{NB}$ designates the distance of re-use of the cellular pattern of the second network. $\gamma$ designates a propagation constant in the networks.

For example, for a cellular pattern of the first network having a uniform distribution of cells on each of concentric levels, the numbers of preselected cells in the specified sector on the levels starting from the given cell are respectively equal at most to the ranks of levels counted from the given cell to the level lower than the predetermined high level, all of the preselected cells on a level being symmetrical relative to the bisector of the specified sector.

When the number of levels lower than the high level is greater than 2, the transmissions of subcarriers in the given cell and in the preselected cells adjacent to the given cell may be considered as very interfering to the carriers transmitted in these cells. In this case, the attenuation parameters may be zero for subcarriers adjacent to carriers belonging to groups allocated to second base stations in preselected cells in the specified sector which are situated on at least one of the two first levels, i.e. on the first level including the given cell in which the transmitter is located, or this first level and the second level surrounding the given cell. Consequently, the adjacent subcarriers previously defined are not transmitted by the first base station included in the given cell.

The invention also relates to a transmitter/receiver such as a base station or a mobile capable of being located in a given cell of a first cellular wireless communication network in order to adapt transmission powers of subcarriers as a function of the transmission powers of carriers in a second cellular wireless communication network, the first and second networks having in common cells each having, collocated, a first base station with several directional sectors of the first network and a second omnidirectional base station of the second network and a wide frequency band including the subcarriers allocated to the sectors of the first base stations and the groups of carriers allocated respectively to the second base stations in a cellular pattern of re-use of the second network having several concentric levels of cell location.

The transmitter/receiver is characterised in that it comprises a means for attenuation by an attenuation parameter of a predetermined power of each subcarrier which is to be transmitted in a specified sector of the given cell and which is adjacent to a carrier belonging to one of the groups allocated to second base stations in preselected cells in the specified sector and on levels starting from the given cell below a predetermined high level, the attenuation parameter being all the more low as the respective level is close to the given cell, and a means for transmitting the subcarriers in the specified sector with the predetermined transmission power other than said adjacent subcarriers.

According to another embodiment, the transmitter/receiver is characterised in that it comprises a means for classifying carriers of groups allocated to second base stations of preselected cells in a specified sector of the given cell and on levels starting from the given cell below a predetermined high level, into classes associated respectively with the levels, with attenuation parameters and with thresholds which are all the more low as the associated levels are distanced from the given cell, the carriers in a class having reception powers at a point situated in the given cell and in the specified sector comprised between the threshold associated with the class and the preceding threshold, a means for attenuation by an attenuation parameter of a predetermined power for each subcarrier when the subcarrier is adjacent to a carrier belonging to the class associated with the attenuation parameter, and a means for transmitting the subcarriers in the specified sector with the predetermined transmission power in the specified sector other than said adjacent subcarriers.

The invention also relates to a broadband wireless communication network comprising, as first network, base stations with several directional sectors as transmitter/receivers according to the invention in order to transmit subcarriers comprised in a frequency band dedicated to downlinks and having transmission powers to adapt to the transmission powers of carriers included in the frequency band dedicated to the downlinks and capable of being transmitted by omnidirectional base stations in a narrowband wireless communication network as second network collocated with the broadband network, and mobiles as transmitter/receivers according to the invention in order to transmit other subcarriers comprised in a frequency band dedicated to uplinks and having transmission powers to adapt to the transmission power of other carriers included in the frequency band dedicated to the uplinks and capable of being transmitted by mobiles in the narrowband network.

The invention also relates to a computer program suitable for implementation in a transmitter/receiver. The program is characterised in that it comprises instructions which, when the program is executed in the transmitter/receiver, carry out the method according to the invention.

Other characteristics and advantages of the present invention will become more clearly apparent from a reading of the following description of several embodiments of the invention given by way of non-limiting examples with reference to the corresponding appended drawings, in which.

Figure 12:
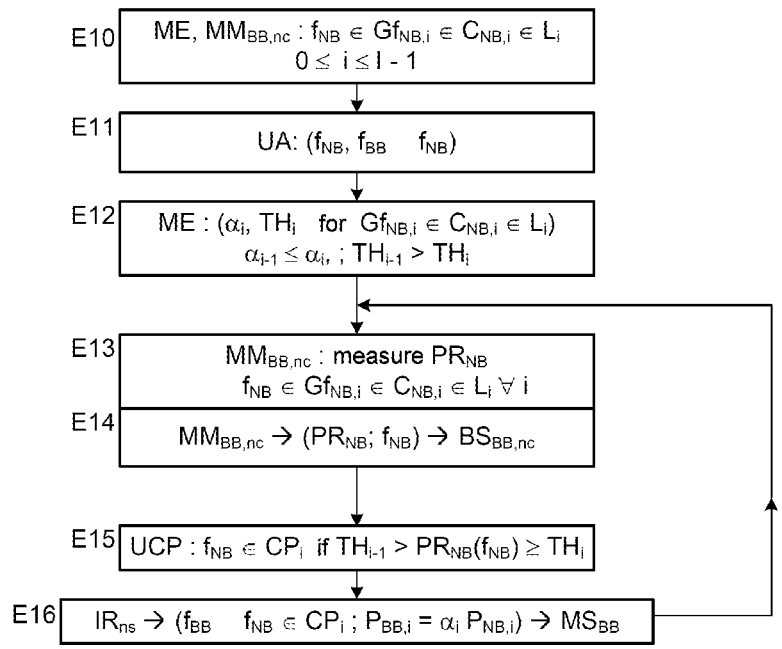
Figure 13:
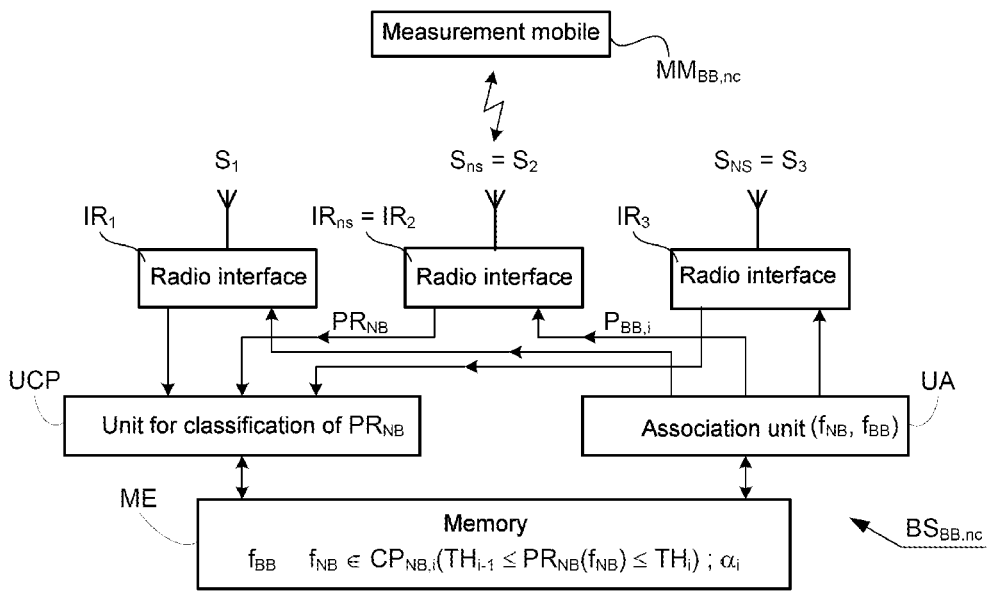

FIG. 12 shows an algorithm of the method for adapting transmission powers of subcarriers in a base station of the broadband network as a function of the reception powers in the cell including the base station, according to a second embodiment; and FIG. 13 shows a schematic block diagram of a base station of the broadband network according to the invention for the implementation of the second embodiment of the method.

Figure 1:
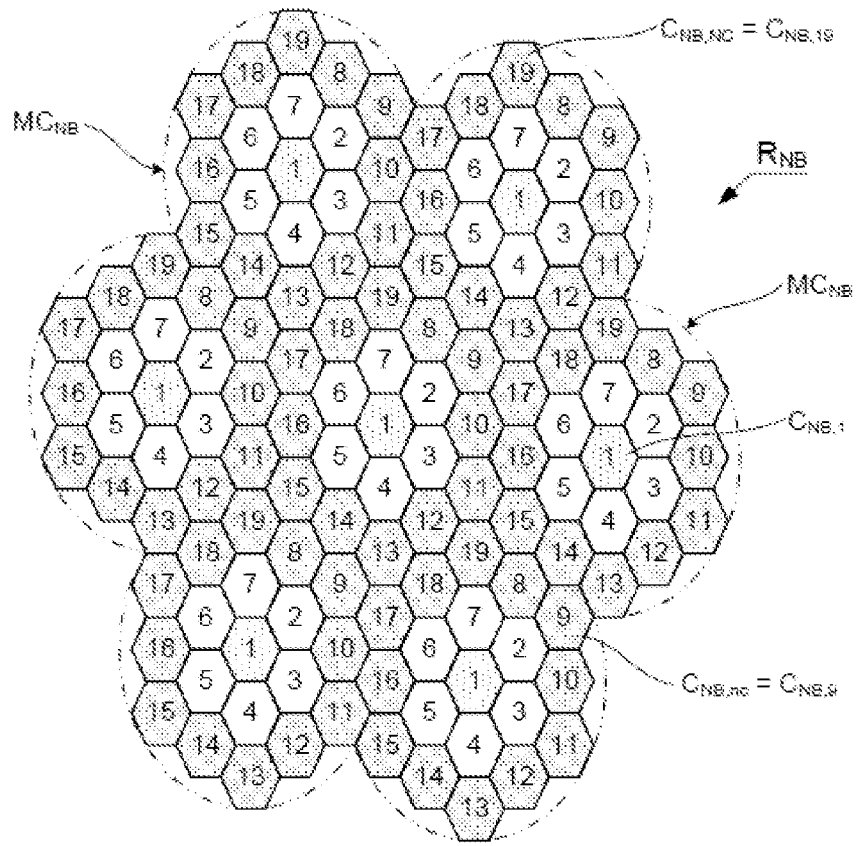
FIG. 1 shows a diagram of several patterns of a narrowband cellular wireless communication network.
Figure 4:
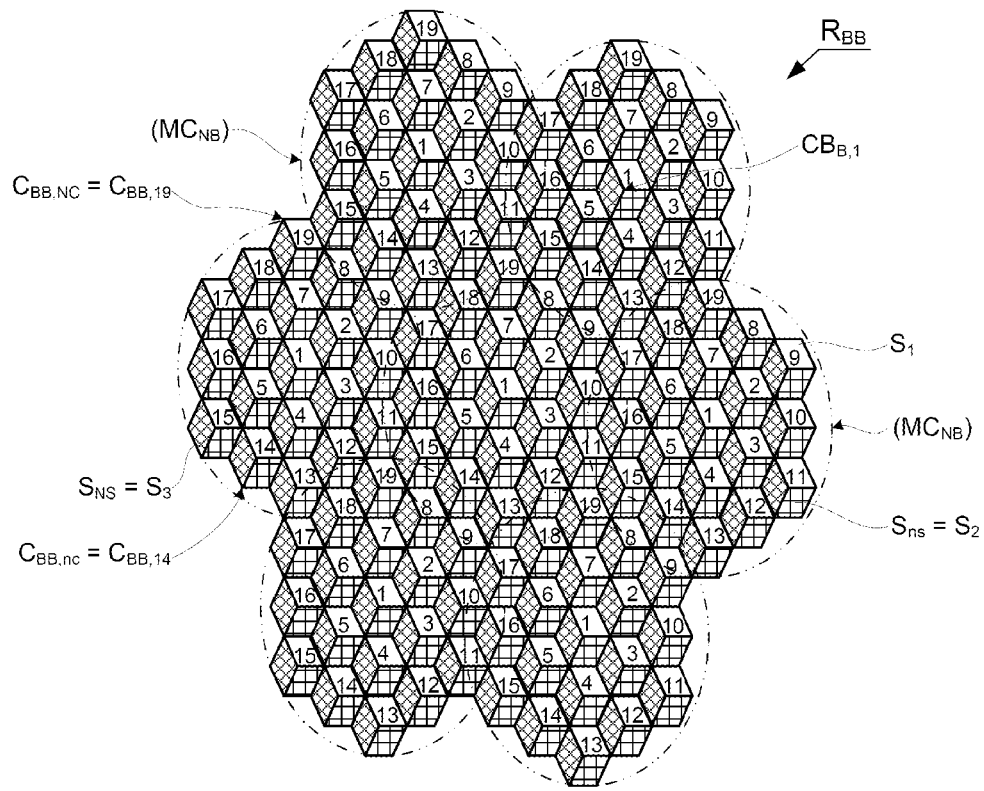
FIG. 4 shows a diagram of a part of a cellular broadband wireless communication network which can be superimposed on the patterns of the narrowband network shown in FIG. 1.

FIGS. 1 and 4 show in the form of regular theoretical hexagons the radio cells $C_{NB}$ of a narrowband cellular wireless communication network $R_{NB}$ and the radio cells $C_{BB}$ of a broadband cellular wireless communication network $R_{BB}$. The networks $R_{NB}$ and $R_{BB}$ are collocated, which means that each cell $C_{NB}$ can be superimposed on a cell $C_{BB}$ and a cell $C_{NB}$-$C_{BB}$ common to the networks comprises centrally a base station $BS_{NB}$ of the network $R_{NB}$ and a base station $BS_{BB}$ of the network $R_{BB}$ which are collocated.

Figure 3:
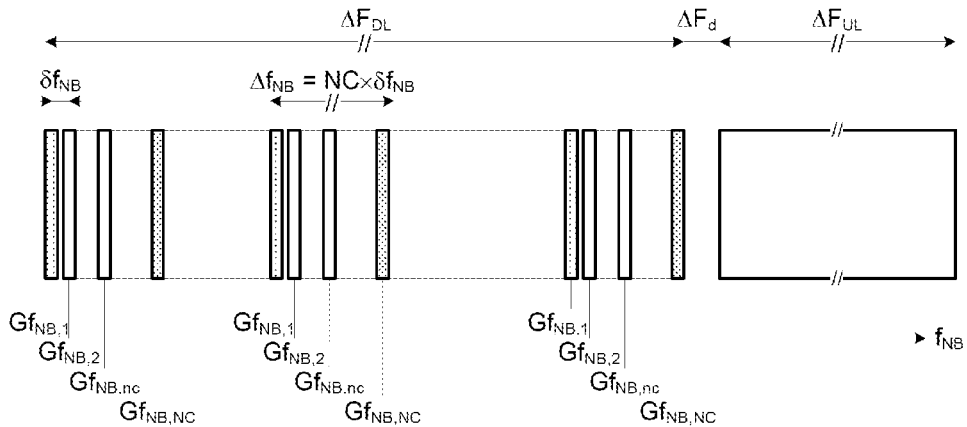
FIG. 3 shows a diagram in time and frequency of groups of carriers in a wide frequency band reserved for downlinks, allocated to base stations in cells of a pattern of the narrowband network, a wide frequency band reserved for uplinks being likewise shown.
Figure 6:
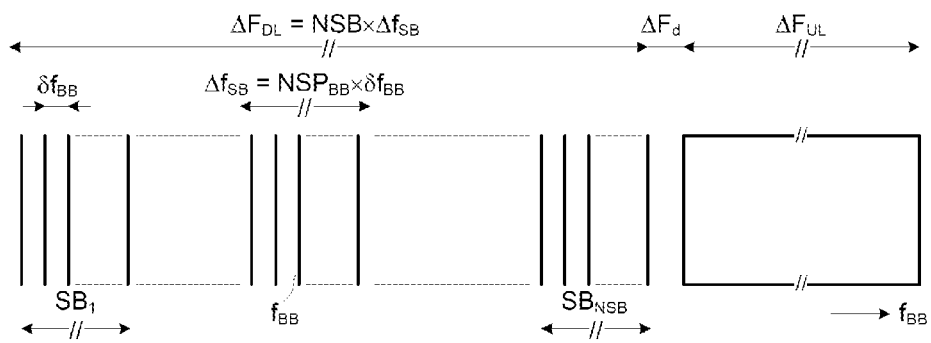
FIG. 6 shows a diagram in time and frequency similar to FIG. 3, showing sub-bands of sub-carriers in the wide frequency band reserved for downlinks and available for each sector of the base stations of the broadband network.

The networks $R_{NB}$ and $R_{BB}$ function in frequency division duplex mode FDD in a common wide frequency band $\Delta F_{DL}$ reserved for the downlinks and a common wide frequency band $\Delta F_{UL}$ reserved for the uplinks, separated by a small frequency duplex interval $\Delta F_d$, as shown in FIGS. 3 and 6. The band total ($\Delta F_{DL}$, $\Delta F_{UL}$) is of the order of 1.4 MHz to 20 MHz. By way of example, the invention is described in the following description according to a predetermined transmission direction corresponding to the frequency band $\Delta F_{DL}$ relating to downlinks from the base stations $BS_{NB}$ towards mobiles $MS_{NB}$ in the network $R_{NB}$ and from the base stations $BS_{BB}$ towards mobiles $MS_{BB}$ in the network $R_{BB}$.

The narrowband network $R_{NB}$ is for example a professional private network PMR for example of the DMR, TETRA, TETRAPOL or P25 type. It is used for public security services. The security constraints of the narrowband network $R_{NB}$ require that the communications in this network must be established quickly and maintained and thus must take priority relative to communications in the broadband network $R_{BB}$. Each base station $BS_{NB}$ of the narrowband network $R_{NB}$ has an omnidirectional antenna and transmits carriers $f_{NB}$ in the frequency band $\Delta F_{DL}$ which may interfere a priori with subcarriers $f_{BB}$ transmitted in the frequency band $\Delta F_{DL}$ by the base stations $BS_{BB}$ of the broadband network $R_{BB}$ situated in the proximity of the base station $BS_{NB}$. To this end, the invention is based on the principle that the radio frequency signals transmitted in the broadband network $R_{BB}$ must be adapted in terms of power and of frequency to the radio frequency signals transmitted from the narrowband network $R_{NB}$ in order to disrupt them as little as possible, i.e. to reduce as much as possible the interference between carriers $f_{NB}$ and adjacent subcarriers $f_{BB}$ allocated respectively to the networks $R_{NB}$ and $R_{BB}$.

Figure 2:
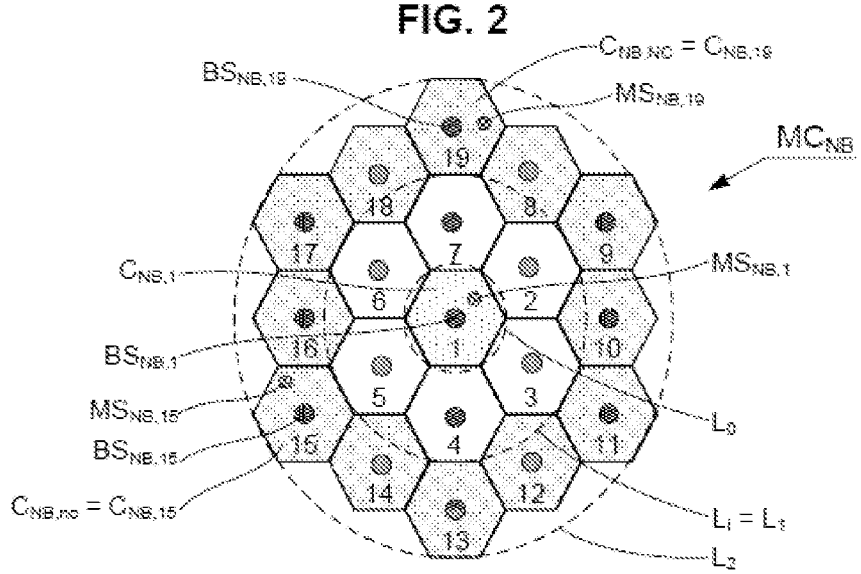
FIG. 2 shows a diagram of a pattern of the narrowband network.

According to the example shown in FIGS. 1 and 2, the cellular pattern of re-use $MC_{NB}$ of the network $R_{NB}$ comprises NC=19 cells $C_{NB,1}$ to $C_{NB,NC}$ with a distance of re-use $D_{NB}=\sqrt{3NC}$ R=$\sqrt{57}$ R, which cells can be superimposed respectively on NC=19 cells $C_{BB,1}$ to $C_{BB,NC}$ of the network $R_{BB}$. R is the length of one side of a hexagonal cell.

By convention, the numbering of cells in FIGS. 1 and 2 is organised according to concentric levels of location of cell $L_0$ to $L_2$ from the centre towards the periphery of a pattern $MC_{NB}$. The level $L_0$ comprises the cell $C_{NB,1}$ central to the pattern. The level $L_1$ comprises the cells $C_{NB,2}$ to $C_{NB,7}$ of the pattern. The level $L_2$ comprises the cells $C_{NB,8}$ to $C_{NB,NC}=C_{NB,19}$ of the pattern. The levels $L_0$, $L_1$ and $L_2$ and two other levels $L_{I-1}=L_3$ and $L_4$ are likewise defined for cells in which base stations $BS_{BB}$ of the network $R_{BB}$ are likely to interfere with the transmission of the base station $BS_{NB,1}$ in the central cell $C_{NB,1}$ of the pattern $MC_{NB}$ of the narrowband network $R_{NB}$, as will be seen below. The level $L_3$ shown in FIGS. 7 and 8 surrounds the pattern $MC_{NB}$ and comprises cells $C_{BB}$ of the broadband network $R_{BB}$ belonging to patterns adjacent to the pattern $MC_{NB}$. Beyond the level $L_3$, a level $L_4$ comprises the other cells of the network $R_{NB}$ and in particular the cells belonging to the six patterns surrounding the pattern $MC_{NB}$. All the I=4 levels $L_0$ to $L_3$ can be defined relative to any given cell $C_{NB,nc}$ in the network $R_{NB}$.

The radio frequency signals transmitted by the base stations $BS_{NB}$ of the cells in the pattern $MC_{NB}$ are supported by carriers $f_{NB}$ regularly distributed with a pitch $\delta f_{NB}$ for example of 10 kHz or 12.5 kHz in the wide band $\Delta F_{DL}$ and a useful narrow band by carrier less than $\delta f_{NB}$. As shown in FIG. 3, the band $\Delta F_{DL}$ is shared in NC groups $Gf_{NB,1}$ to $Gf_{NB,NC}$ of carriers $f_{NB}$ respectively allocated to the NC cells in the pattern of the narrowband network $R_{NB}$. In order not to overload FIG. 3, two lower carriers, an intermediate carrier and an upper carrier overflow are only shown for each of the four groups $Gf_{NB,1}$, $Gf_{NB,2}$, $Gf_{NB,nc}$ and $Gf_{NB,NC}$ allocated to the base stations of the cells $C_{NB,1}$, $C_{NB,2}$, $C_{NB,nc}$ and $C_{NB,NC}$. The carriers of the group $Gf_{NB,nc}$ allocated to a cell $C_{NB,nc}$ of a pattern $MC_{NB}$, are interlaced with the carriers of the groups $Gf_{NB,1}$ of $Gf_{NB,nc-1}$ and $Gf_{NB,nc+1}$ to $Gf_{NB,NC}$ allocated to the other cells $C_{NB,1}$ to $C_{NB,nc-1}$ and $C_{NB,nc+1}$ to $C_{NB,NC}$ of the pattern, with $1 \leq nc \leq NC=19$. Two successive carriers in the group allocated to a cell are separated by a frequency interval $\Delta f_{NB} = NC \times \delta f_{NB}$ in which a carrier of each of the groups allocated to the others cells is disposed.

The broadband network $R_{BB}$ is a network for third generation 3GPP (Third Generation Partnership Project) mobiles based for example on the LTE technology with a frequency band of 1.4 MHz to 20 MHz. The network $R_{BB}$ supports radio downlinks with mobiles of the orthogonal frequency division multiple access OFDMA type and radio uplinks with mobiles of the single carrier frequency division multiple access SC-FDMA type.

Figure 5:
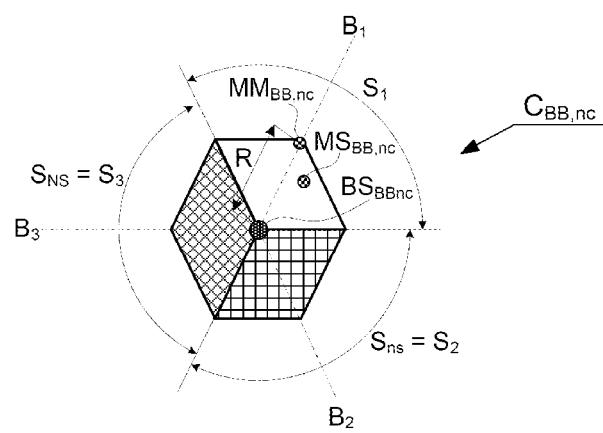
FIG. 5 shows a diagram of a cell with three directional sectors of the broadband network.

Each cell $C_{BB}$ of the broadband network $R_{BB}$ uses subcarriers $f_{BB}$ uniformly distributed in the wide frequency band $\Delta F_{DL}$ and includes a base station $BS_{BB}$ with directional and separate NS circular sectors $S_1$ to $S_{NS}$. According to an example to which reference will be made, each base station $BS_{BB}$ is divided into three sectors and comprises NS=3 separate sectors of 120° $S_1$, $S_2$ and $S_3$, as shown in FIG. 5. Each sector $S_{ns}$ with $1 \leq ns \leq NS=3$ models a sub-cell having a zone covered by a directional antenna linked to a respective radio interface serving as transmitter/receiver of the base station $BS_{BB}$. The sub-cell is theoretically limited by the sides of the sector at the top of which the radio interface is substantially situated. All the base stations $BS_{BB}$ are identical and consequently the cellular pattern of re-use in the network $R_{BB}$ is reduced to one cell $C_{BB}$ and therefore the re-use factor of the network $R_{BB}$ is equal to 1. The numbering of the cells $C_{BB}$ is identical to that of the cells $C_{NB}$ in a pattern of the narrowband network, for instance $1 \leq nc \leq NC=19$.

It will be considered below that the wide frequency band $\Delta F_{DL}$ is allocated indiscriminately to each of the sectors $S_1$ to $S_{NS}$ of a cell $C_{BB}$ and that the radio interface of each sector $S_{ns}$ is likely to transmit on any subcarriers $f_{BB}$ in the band $\Delta F_{DL}$. This means that either all the subcarriers $f_{BB}$ allocated to the network $R_{BB}$ can be used by each sector of a cell, or subcarriers $f_{BB}$ in a part of the band $\Delta F_{DL}$ can be used by all the sectors of a cell, which amounts to having a frequency band common to the sectors, and the other remaining part of the band $\Delta F_{DL}$ is divided into NS parts respectively allocated to the NS sectors.

In general, it will be considered that a base station $BS_{BB}$ of the network $R_{BB}$ is of the LTE type and can transmit towards each sector in any of the separate sub-bands of the wide band $\Delta F_{DL}$. Each of these separate sub-bands supports for example 20 blocks of resources or time slots of 0.5 ms during a frame of 10 ms. For example as shown in FIG. 6, the frequency band $\Delta F_{DL}$ comprises NSB consecutive frequency sub-bands SB, to $SB_{NSB}$ each having a frequency width $\Delta f_{SB} = \Delta F_{DL}/NSB = 180$ kHz of a resource block and each comprising $NSP_{BB} = 12$ consecutive subcarriers $f_{BB}$ spaced by a pitch $\delta f_{BB} = \Delta f_{SB}/NSP_{BB} = 15$ kHz.

According to another example, the broadband network $R_{BB}$ is based on the mobile WiMAX technology. The network $R_{BB}$ supports radio downlinks and uplinks with mobiles of the orthogonal frequency division multiple access OFDMA type. In the frequency domain, a resource block of the network LTE is comparable to a resource block of the WiMAX network comprising for example 2 clusters each extending over 14 contiguous subcarriers of width of $\delta f = 10.94$ kHz, for instance $NSP_{BB} = 28$, and on a common time slot of 2 periods of symbol $Ts = 102.9$ μs.

According to other examples, the number NC of cells in the pattern of re-use of the network $R_{NB}$ is greater than 2, the number NS of sectors per base station $BS_{BB}$ is at least equal to 2, and the number of levels relative to any given cell $C_{NB,nc}$ in the network $R_{NB}$ is at least equal to 2, wherein a level can comprise both cells of one pattern and cells of at least one other adjacent pattern. For example for NC=4, the second level comprises 3 cells of the pattern containing the given cell and 3 cells respectively in 3 patterns adjacent to the pattern.

The comparison of FIGS. 3 and 6 shows that as a function of the ratio of the frequency steps $\delta f_{NB}/\delta f_{BB}$, the useful band of a subcarrier $f_{BB}$ of the broadband network overlaps at least the useful band of a carrier $f_{NB}$ of the narrowband network, or even two or more useful bands of carriers $f_{NB}$. Consequently for a carrier $f_{NB}$ of the group allocated to a base station $BS_{NB}$, signals supported in useful bands of subcarriers $f_{BB}$ at least partially covering the useful band of the carrier $f_{NB}$ and transmitted in sectors of adjacent base stations $BS_{BB}$ oriented towards the base station $BS_{NB}$ interfere with the signals supported by the carrier $f_{NB}$ of the base station $BS_{NB}$. The interference caused by a subcarrier $f_{BB}$ is all the more substantial as the power thereof received in the cell $C_{NB}$ of the base station $BS_{NB}$ is high and consequently that the distance between the sites where an adjacent base station $BS_{BB}$ transmitting the subcarrier $f_{BB}$ and the base station $BS_{NB}$ are situated is small.

As is known, the power received at a given measurement point at a distance D of a base station transmitting a transmission power $P_{NB}$ is proportional to $P_{NB}/D^\gamma$ where $\gamma$ designates a propagation constant in the networks comprised between about 3 and about 4 and dependent upon the radio propagation conditions between the base station and the measurement point. In the following description, $P_{NB}$ designates a predetermined transmission power for each carrier $f_{NB}$ to be transmitted by a base station $BS_{NB}$ or for each subcarrier $f_{BB}$ to be transmitted by a base station $BS_{BB}$ when the subcarrier transmitted $f_{BB}$ is considered as not disrupting the reception in the narrowband network $R_{NB}$.

The invention is based on the evaluation of interference of the signals transmitted by base stations $BS_{BB}$ of the broadband network $R_{BB}$ on signals received by a mobile, referred to as a power measurement mobile $MM_{NB,nc}$, in a cell $C_{NB,nc}$ of the narrowband network $R_{NB}$ and in particular on each of the carriers $f_{NB}$ of the group $Gf_{NB,nc}$ allocated to the base station $BS_{NB,nc}$ of the cell $C_{NB,nc}$ in order to deduce therefrom the powers which the base stations $BS_{BB}$ must transmit for the subcarriers $f_{BB}$ interfering with the carrier $f_{NB}$.

Figure 7:
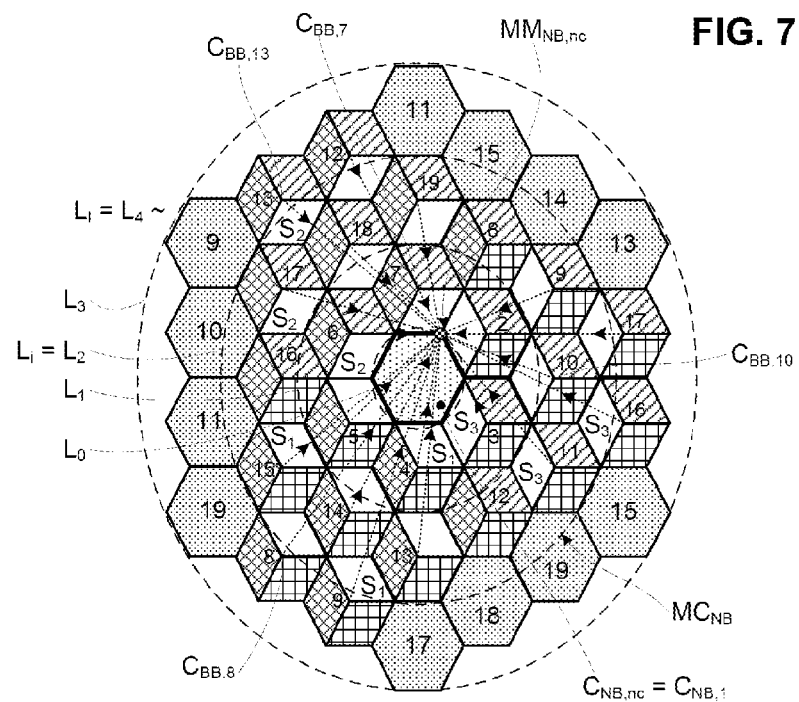
FIG. 7 shows schematically transmissions in sectors of cells of the broadband network disrupting the reception in a mobile included in a cell of the narrowband network.

As shown in FIG. 7, the measurement mobile $MM_{NB,nc}$ is assumed to be positioned at the edge of a given cell $C_{NB,nc}$, for example the central cell $C_{NB,1}$ of the pattern $MC_{NB}$, on the bisector of one of the three sectors $S_1$ to $S_{NS}$ of the cell $C_{BB,1}$, for example on the bisector $B_1$ of the upper right sector $S_1$ shown on an enlarged scale in FIG. 5. Thus the measurement mobile is located at a measurement point furthest from the centre of the cell $C_{BB,1}$ where the interference with the adjacent cells $C_{NB,7}$ and $C_{NB,2}$ is maximum, for at a distance R from the base station $BS_{NB,1}$ to the centre of the cell $C_{NB,1}$.

The deterioration of the reception in the measurement mobile $MM_{NB,nc}$ due to the transmissions in the broadband network $R_{BB}$ is evaluated for a selection of sectors of the cells $C_{BB}$ of the network $R_{BB}$ of which the transmission powers are considered as sufficiently high to interfere with the received signals and which therefore have orientations of their radiation patterns which are predominant towards the mobile $MM_{NB,nc}$ and distances of several cellular levels to the mobile $MM_{NB,nc}$. As shown in FIG. 7, the sectors of the cells $C_{BB}$ of the network $R_{BB}$ interfering with the reception of the mobile $MM_{NB,nc}$ are selected on the levels $L_0$ to $L_3$. The measurement mobile is insensitive to the transmission powers of the remote base stations $BS_{BB}$ beyond the level $L_3$.

On the other hand, the measurement mobile $MM_{NB,nc}$ is sensitive to the transmission powers of the base stations $BS_{NB}$ in the central cells $C_{NB,1}$ of the narrowband network $R_{NB}$ belonging to the six adjacent patterns included in the remote global level $L_4$. In the absence of the broadband network $R_{BB}$, the carrier to interference ratio $(C/I)_{NB}$ relating to a given carrier $f_{NB}$ having the predetermined transmission power $P_{NB}$ and belonging to the group $Gf_{NB,1}$ allocated to the given cell $C_{NB,nc}=C_{NB,1}$ is:

$(C/I)_{NB}=(P_{NB}/R^\gamma)/(6\ P_{NB}/D_N^\gamma)=D_{NB}^\gamma/(6\ R^\gamma)$, where R is the distance between the base station $BS_{NB,1}$ at the centre of the cell $C_{NB,1}$ and the measurement mobile $MM_{NB,nc}$ at a vertex of the cell $C_{NB,1}$, $(P_{NB}/R^\gamma)$ is the power of the base station $BS_{NB,1}$ for the given carrier $f_{NB}$ received by the measurement mobile, $D_{NB}=\sqrt{57}\ R$ is the average distance between the measurement mobile and the base stations in the central cells $C_{NB,1}$ of six adjacent patterns, and $(P_{NB}/D_{NB}^\gamma)$ is the power of one of the preceding six base stations $BS_{NB,1}$ received by the measurement mobile, The interference power of the given carrier $f_{NB}$ supplied by the selected NS, sectors of the cells $C_{BB}$ of the broadband network $R_{BB}$ on each one $L_i$ of the levels $L_0$ to $L_3$ interfering with the reception in the measurement mobile $MM_{NB,nc}$ with $0 \leq i \leq I-1=3$, is $NS_i\ \alpha_i\ P_{NB}/D_i^\gamma$. $\alpha_i$ is an attenuation parameter of the transmission power of the base station $BS_{BB}$ for the selected sector of the cells $C_{BB}$ on the level $L_i$, $\alpha_i$ being comprised between 0 and 1. $D_i$ is the average distance between the measurement mobile $MM_{NB,nc}$ and one of the base stations $BS_{NB}$ in the cells on the level $L_i$ of which $NS_i$ sectors are selected, the measurement mobile $MM_{NB,nc}$ being thus located at a measurement point in the cell $C_{NB}$ furthest on average from the centres of the cells having a selected sector of the same orientation $S_{nc}$ on the respective level $L_i$. $P_{NB}/D_i^\gamma$ is the power of the radio interface in a selected sector of one of the preceding base stations $BS_{NB}$ for an adjacent subcarrier $f_{BB}$ of the given carrier $f_{NB}$ and interfering with the reception of the given carrier $f_{NB}$ in the measurement mobile $MM_{NB,nc}$.

The selected sectors interfering with the reception of carriers in the measurement mobile $MM_{NB,nc}$ for each of the concentric levels $L_0$ to $L_3$ are illustrated by quadrilaterals without hatching in FIG. 7 and are as follows for the given cell $C_{NB,nc}=C_{NB}$:

at the level $L_0$, the single sector $S_1$ of the base station $BS_{BB,1}$ in the cell $C_{NB,1}$ containing the measurement mobile $MM_{NB,nc}$ and situated at a distance $D_0=R$, i.e. $NS_0=1$;

at the level $L_1$, the sectors $S_1$ in the cells $C_{NB,4}$ and $C_{NB,5}$, the sectors $S_2$ in the cells $C_{NB,6}$ and $C_{NB,7}$ and the sectors $S_3$ in the cells $C_{NB,2}$ and $C_{NB,3}$ oriented towards the cell $C_{NB,1}$ and originating from base stations $BS_{BB}$ situated at an average distance $D_1=\sqrt{3}\ R$ of the measurement mobile $MS_{NB}$, i.e. $NS_1=6$;

at the level $L_2$, the sectors $S_1$ of the cells $C_{NB,13}$, $C_{NB,14}$ and $C_{NB,15}$, the sectors $S_2$ of the cells $C_{NB,17}$, $C_{NB,18}$ and $C_{NB,19}$ and the sectors $S_3$ of the cells $C_{NB,9}$, $C_{NB,10}$ and $C_{NB,11}$ covering the cell $C_{NB,1}$ and originating from base stations $BS_{BB}$ situated at an average distance $D_2=3R$ of the measurement mobile $MM_{NB,nc}$, i.e. $NS_2=9$; and at the level $L_3$, the sectors $S_1$ of the cells $C_{NB,8}$, $C_{NB,9}$, the sectors $S_2$ of the cells $C_{NB,12}$ and $C_{NB,13}$ and the sectors $S_3$ of the cells $C_{NB,16}$ and $C_{NB,17}$ having a central half-sector of 60° covering the cell $C_{NB,1}$ these $NS_3=6$ cells belong to three adjacent patterns at the periphery of the pattern $MC_{NB}$, as shown in FIGS. 1, 4 and 7, and include base stations $BS_{BB}$ situated at an average distance $D_3=4R$ of the measurement mobile $MM_{NB,nc}$.

All the $NC \times NS - (1+6+9)=41$ other sectors of the central pattern $MC_{NB}$ and the $(17 \times 3)-NS_3=45$ other sectors on the level $L_3$ are oriented in divergent directions relative to the given cell $C_{NB,nc}=C_{NB}$ and/or are too remote from the given cell in order to interfere sufficiently with the reception in the measurement mobile $MM_{NB,nc}$.

The carrier to interference ratio $(C/I)_{NB\_BB}$ in the measurement mobile $MM_{NB,nc}$ relating to a carrier $f_{NB}$ having a transmission power $P_{NB}$ interfered with by the same carrier $f_{NB}$ transmitted by the base stations $BS_{NB}$ in the cells $C_{NB,nc}=C_{NB,1}$ of the narrowband network $R_{NB}$ belonging to the six adjacent patterns and by adjacent subcarriers $f_{BB}$ transmitted by the selected sectors of the base stations $BS_{BB}$ on the levels $L_0$ to $L_3$ is as follows, assuming that all these carriers and subcarriers are transmitted with an equal power $P_{NB}$:

$$(C/I)_{NB\_BB}=(P_{NB}/R^\gamma)/(6\ P_{NB}/D_{NB}^\gamma+\Sigma_{i=0}^{i=I-1} NS_i\alpha_iP_{NB}/D_i^\gamma),\ \text{with}$$

$$\Sigma_{i=0}^{i=I-1}NS_i\alpha_iP_{NB}/D_i^\gamma=\alpha_0P_{NB}/D_0^\gamma+6\ \alpha_1P_{NB}/D_1^\gamma+9\ \alpha_2P_{NB}/D_2^\gamma+6\ \alpha_3P_{NB}/D_3^\gamma.$$

Assuming that a minimal deterioration of the carrier to interference ratio $\alpha_{target}\ (C/I)_{NB}=(C/I)_{NB\_BB}$ at the reception in the measurement mobile $MM_{NB,nc}$ in the given cell $C_{NB,nc}$ due to the interfering transmissions is acceptable for a predetermined attenuation $\alpha_{target}$, the following relationship between the attenuation parameters is deduced $$\alpha_{target}=1/[1(\Sigma_{i=0}^{i=I\ 31\ 1}(NS_i\alpha_i/D_i^\gamma)D_{NB}^\gamma/6], \tag{1}$$

and becomes, by indicating the number of cells $NS_i$:

$$\alpha_0/D_0^\gamma+6\ \alpha_1/D_1^\gamma+9\ \alpha_2/D_2^\gamma+6\ \alpha_3/D_3^\gamma=6(1-\alpha_{target})/(D_{NB}^\gamma\alpha_{target}).$$

According to an embodiment, each attenuation parameter a, with $0 \leq i \leq I-1=3$ is considered as proportional to the average distance $D_i$ between the measurement mobile $MM_{NB,nc}$ in the given cell $C_{NB,nc}$ and the base stations $BS_{BB}$ in the cells $C_{BB}$ having a selected sector on the level $L_i$, in the knowledge that for a given transmission power the reception power is proportional to the ratio $\alpha_i/D_i^\gamma$. For example, each parameter $\alpha_i$ is given by the following formula:

$$\alpha_i = k\, D_i^\gamma D_{NB}^\gamma, \quad (2)$$

wherein k is a factor which is a function of the predetermined attenuation referred to as $\alpha_{target}$:

$$(1+6+9+6)(k/D_{NB}^\gamma) = 6(1-\alpha_{target})/(D_{NB}^\gamma \alpha_{target}), \quad (3)$$

i.e. $k = 3(1-\alpha_{target})/(11\,\alpha_{target})$.

For example, if $\alpha_{target} = -1$ dB, then $k = 0.07$, and for a propagation constant $\gamma = 4$ of the networks in an urban environment, the attenuation parameters are $\alpha_0 \cong -50$ dB, $\alpha_1 \cong -40$ dB, $\alpha_2 \cong -30$ dB and $\alpha_3 \cong -20$ dB. The attenuation parameter $\alpha_i$ is all the more low as the power of the interfering base station $BS_{BB}$ is close to the given cell $C_{NB,nc}$ and therefore that the distance $D_i$ is short, i.e. $\alpha_0 < \alpha_1 < \alpha_2 < \alpha_3$.

According to another example, the selected sectors in the cells $C_{BB}$ on the levels $L_0$ and $L_1$ produce a very high deterioration upon reception in the given cell $C_{NB,nc}$ and consequently the parameters $\alpha_0$ and $\alpha_1$ are equal to 0. In this example, the relationship (3) becomes:

$$(9+6)(k/D_{NB}^\gamma) = 6(1-\alpha_{target})/(D_{NB}^\gamma \alpha_{target}), \text{ i.e.}$$

$$k = 3(1-\alpha_{target})/(5\,\alpha_{target}) = 0.1 \text{ for } \alpha_{target} = -1 \text{ dB}.$$

The attenuation parameters are $\alpha_2 \cong -20$ dB and $\alpha_3 \cong -25$ dB for $\gamma = 4$.

The adaptation of the transmission powers of subcarriers $f_{BB}$ transmitted in the common wide frequency band $\Delta F_{DL}$ by a specified sector $S_{ns}$ of a base station $BS_{BB,nc}$ in a given cell $C_{BB,nc}$ is now deduced from the above evaluation of interference of subcarriers $f_{BB}$ transmitted by base stations $BS_{BB}$ and adjacent to a carrier $f_{NB}$ on the reception thereof in a cell $C_{NB}$ of the narrowband network $R_{NB}$. For this adapting the invention considers that the reception of a subcarrier $f_{BB}$ by a measurement mobile $MS_{BB,nc}$ of the network $R_{BB}$ in the predetermined sector $S_{ns}$ of the given cell $C_{BB,nc}$ can be interfered with a priori by any carrier $f_{NB}$ comprised in a frequency interval $\Delta f_{NB} = NC \times \delta f_{NB}$ centred on the subcarrier $f_{BB}$ and therefore a priori by one of the carriers $f_{NB}$ of each of the NC groups $Gf_{NB,1}$ to $Gf_{NB,NC}$ of carriers $f_{NB}$ respectively allocated to the NC cells in the pattern of the narrowband network $R_{NB}$. For the specified sector $S_{ns}$ of the given cell $C_{BB,nc}$ of the broadband network, base stations $BS_{NB}$ located in sight of the specified sector $S_{ns}$ and interfered with by the transmission of the base station $BS_{BB,nc}$ in the sector $S_{ns}$ are preselected on concentric levels of location of cell $L_0$ to $L_3 = L_{I-1}$ from the centre of the given cell $C_{BB,nc}$ towards the periphery of the pattern centred thereon.

Figure 8:
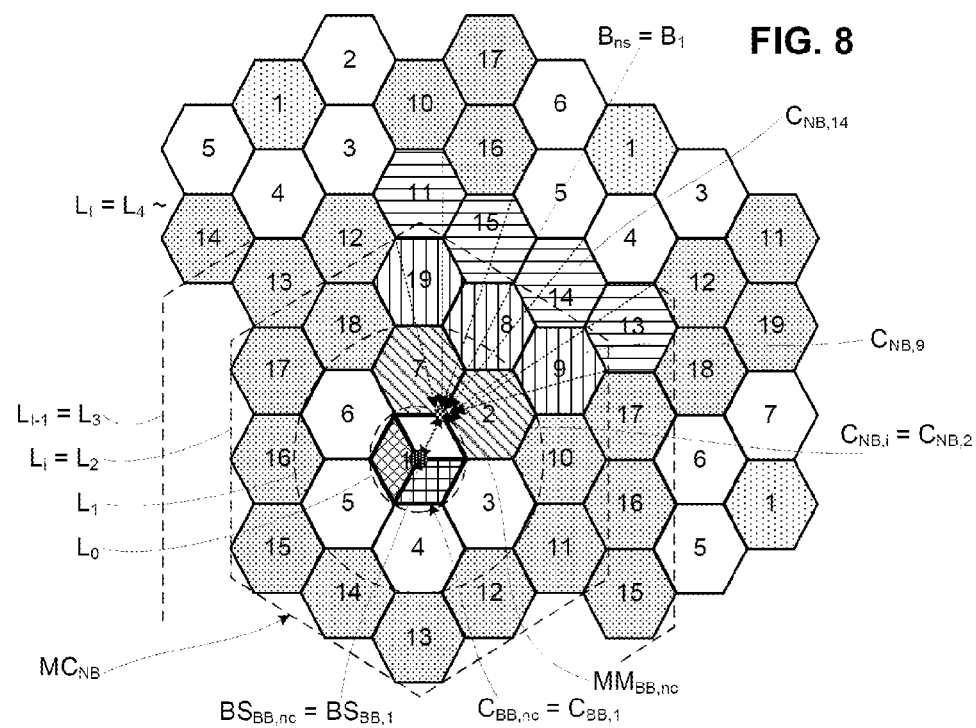
FIG. 8 shows schematically transmissions from a sector of a cell of the broadband network interfering with the reception in cells of the narrowband network.

Reference will be made for example to the specified sector $S_{ns} = S_1$ of the given cell $C_{BB,nc} = C_{BB,1}$ of a pattern as shown in FIG. 8.

For the specified sector $S_{ns}$ of the given cell $C_{BB,nc}$ of the broadband network, a carrier to interference ratio $(C/I)_{NB\_BB,i}$ is evaluated for each subcarrier $f_{BB}$ and for each level $L_i$ from the cell $C_{BB,nc}$, with $0 \le i \le I-1 = 3$. The carrier to interference ratios are evaluated in the measurement mobile $MM_{bb,nc}$ which is situated on the bisector $B_{nc}$ of the sector $S_{nc}$ at a distance $D_0 = R$ from the base station $BS_{BB,ns}$, and where the interference in the sectors $S_3$ and $S_2$ of the adjacent cells $C_{BB,2}$ and $C_{BB,7}$ is a maximum.

$P_{BB,i} = \alpha_i P_{NB}$ is the transmission power of the base station $BS_{BB,nc}$ for a subcarrier $f_{BB}$ of which the reception is interfered with by a carrier $f_{NB}$ belonging to a class $CP_i$ of carriers allocated to cells $C_{NB,i}$ on the level $L_i$. From the foregoing, the transmission power $P_{NB}$ initially provided for the subcarrier $f_{BB}$ should be attenuated by the attenuation parameter $\alpha_i$ so as not to significantly interfere with the reception in the cells $C_{NB,i}$ on the level $L_i$ in order to maintain the predetermined attenuation $\alpha_{target}$ in the cells of the narrowband network.

The measurement mobile $MM_{BB,nc}$ receives a reception power $P_{BB,i}/R^\gamma$ of the base station $BS_{BB,nc} = BS_{BB,1}$ which, in the absence of the narrowband network $R_{BB}$, is only interfered with by the reception powers $P_{BB}/R^\gamma$ due to the transmission powers $P_{BB,i}$ in the two sectors $S_3$ and $S_2$ of the two adjacent cells $C_{BB,2}$ and $C_{BB,7}$ considered as situated on the level $L_0$ for the measurement mobile $MM_{BB,nc}$ and in sight of the specified sector $S_{ns} = S_1$ of the given cell $C_{BB,nc} = C_{BB,1}$. In this case, as for any level $L_4$ beyond the level $L_{I-1} = L_3$ on which the cells of the narrowband network $R_{NB}$ are too remote from the given cell $C_{BB,nc}$ to interfere with the reception therein, the carrier to interference ratio $(C/I)_{NB\_BB,I}$ with $I = 4$ is as follows:

$$(C/I)_{NB\_BB} = (P_{NB}/R^\gamma)/(2\,P_{NB}/R^\gamma) = 1/2, \text{ or } -3 \text{ dB}.$$

Moreover, the reception of a subcarrier $f_{BB}$ in the measurement mobile $MM_{BB,nc}$ is interfered with by the reception powers $P_{NB}/D_i^\gamma$ due to the transmission powers $P_{NB}$ of interfering carriers $f_{NB}$ in groups $Gf_{NB,i}$ allocated to base stations $BS_{NB,i}$ in at most $NC_{NB,i} = (i+1)$ preselected cells $C_{NB}$ of the narrowband network which are situated on the level $L_i$ having a rank $i+1$ such that $1 \le i+1 \le I = 4$ counted from the given cell $C_{BB,nc}$. The set of preselected cells on the level $L_i$ is symmetrical relative to the bisector $B_{ns} = B_1$ of the specified sector $S_{ns} = S_1$ of the given cell $C_{BB,nc}$ and is contained in the specified sector. The measurement mobile $MM_{BB,nc}$ is thus located in the sector $S_{ns}$ and in the cell $C_{BB,nc}$ at a measurement point closest on average to the centres of the preselected cells $C_{NB,i}$ on a level $L_i$. According to the preceding example, the preselected interfering cells $C_{NB,i}$ in the sector $S_{ns} = S_1$ of the given cell $C_{BB,nc} = C_{BB,1}$ are the single cell $C_{NB,1}$ ($NC_{NB,0} = 1$) situated on the first level $L_0$ and collocated with the cell $C_{BB,1}$, the $NC_{NB,1} = 2$ cells $C_{NB,2}$ and $C_{NB,7}$ situated on the second level $L_1$, the $NC_{NB,2} = 3$ cells $C_{NB,9}$, $C_{NB,8}$ and $C_{NB,19}$ situated on the third level $L_2$, and the $NC_{NB,3} = 4$ cells $C_{NB,13}$, $C_{NB,14}$, $C_{NB,15}$ and $C_{NB,11}$ situated on the fourth level $L_3$ and at the periphery of adjacent patterns. As a variant, for the fourth level $L_3$, only the 2 interfering cells $C_{NB,14}$ and $C_{NB,15}$ close to the bisector $B_1$ of the specified sector $S_1$ may be preselected, the cells $C_{NB,13}$ and $C_{NB,11}$ being considered as too remote from the cell $C_{BB,1}$ to interfere with the reception of subcarriers $f_{BB}$ in the measurement mobile $MM_{BB,nc}$. Overall, the number of groups of carriers $Gf_{NB,0}$ to $Gf_{NB,I-1} = Gf_{NB,3}$ of the narrowband network $R_{NB}$ interfering with the reception in a sector of each cell of the broadband network $R_{BB}$ is $NGf_{NB} = I(I+1)/2 = 10$ among the NC = 19 groups of frequencies of the network $R_{NB}$.

In the measurement mobile $MM_{BB,nc}$, the contribution of the various aforementioned reception powers for the level $L_i$ in the carrier to interference ratio $(C/I)_{NB\_BB,i}$ for a subcarrier $f_{BB}$ is as follows:

$$(C/I)_{NB\_BB,i} = (P_{BB,i}/R^\gamma)/[(2\,P_{BB,i}/R^\gamma) + (i+1)P_{NB}/D_{I-i}^\gamma].$$

By replacing the power $P_{BB,i}$ by $\alpha_i P_{NB}$, the carrier to interference ratio is:

$$(C/I)_{NB\_BB,i} = (\alpha_i/R^\gamma)/[(2\,\alpha_i/R^\gamma) + (i+1)/D_i^\gamma],$$

$$\text{or } (C/I)_{NB\_BB,i} = \beta_{BB,i}/2 = \beta_{BB,i}(C/I)_{NB\_BB,I}$$

$$\text{with } \beta_{BB,i} = 1/[1+(i+1)R^\gamma/(2\,\alpha_i D_i^\gamma)].$$

Using the preceding formula $\alpha_i = k\, D_i^\gamma / D_{NB}^\gamma$ for the transmission power attenuation parameter of the base station $BS_{BB,nc}$ relative to the preselected cells $C_{NB,i}$ on the level $L_i$, the parameter $\beta_{BB,i}$ representing the deterioration of the subcarrier $f_{BB}$ by carriers $f_{NB}$ transmitted from the level $L_i$ becomes:

$$\beta_{BB,i} = 1/[1+(i+1)(D_{NB}R)^\gamma/(2\, k\, D_i^{2\gamma})].$$

For an urban propagation environment with $\gamma=4$ and the factor $k=0.07$ established previously and corresponding to the predetermined attenuation $\alpha_{target} = -1$ dB for an acceptable deterioration of the carrier to interference ratio in the cells $C_{NB}$ of the narrowband network, the parameters of deterioration $\beta_{BB,i}$ for the levels $L_0$ to $L_3$ are $\beta_{BB,0} \cong -45$ dB, $\beta_{BB,1} \cong -30$ dB, $\beta_{BB,2} \cong -10$ dB, et $\beta_{BB,3} \cong -4$ dB. Beyond these levels, the deterioration is negligible, i.e. $\beta_{BB,4} \cong 0$ dB.

The deterioration parameters $\beta_{BB,0}$ and $\beta_{BB,1}$ being lower than $10^{-3}$, the attenuation parameters $\alpha_0$ and $\alpha_1$ which must be applied to the transmission powers of the subcarriers $f_{BB}$ close to carriers of the groups $Gf_{NB,0}$ and $Gf_{NB,1}$ are therefore very low and consequently these subcarriers $f_{BB}$ become unusable in the base station $BS_{BB,nc}$ of the given cell $C_{BB,nc}$. According to an embodiment, the subcarriers $f_{BB}$ adjacent to the carriers of the groups $Gf_{NB,0}$ and $Gf_{NB,1}$ are not transmitted by the base station $BS_{BB,nc}$ and no reception power is measured in the measurement mobile $MM_{BB,nc}$ for these adjacent subcarriers $f_{BB}$. The groups $Gf_{NB,0}$ and $Gf_{NB,1}$ only represent $(1+2)/NC \cong 15.8\%$ of the groups of frequencies of the network $R_{NB}$. The subcarriers $f_{BB}$ adjacent to the carriers of the other groups $Gf_{NB,2}$ and $Gf_{NB,3}$ and all the other subcarriers $f_{BB}$ for which no deterioration is perceptible upon the reception in the given cell $C_{BB,nc}$ can be used in the base station $BS_{BB,nc}$ and represent $(NC-3)/NC \cong 84.2\%$ of the groups of frequencies of the network $R_{NB}$.

For example, for a frequency sub-band $SB_{BB}$ of the broadband network $R_{BB}$ having $NSP_{BB}=12$ subcarriers $f_{BB}$ on a frequency width $\Delta f_{SB} = NSP_{BB} \times \delta f_{BB} = 12 \times 15 = 180$ kHz of a resource block and for a uniform distribution of $NC=19$ carriers $f_{NB}$ in the frequency sub-band $SB_{BB}$, at the rate of one carrier $f_{NB}$ per group of carriers, at least $NSP_{BB} - (1+2) = 9$ subcarriers $f_{BB}$ are available in each frequency sub-band $SB_{BB}$ for each cell sector of the network $R_{BB}$. The 9 available subcarriers $f_{BB}$ are classified into three classes $CP_2$, $CP_3$ and $CP_4$. The class $CP_2$ comprises $NSP_{NB,2}=2$ subcarriers $f_{BB}$ each having a frequency band $\delta f_{BB}=15$ kHz which is covered at least partially by the frequency band $\delta f_{NB}=180/19$ kHz of at least one of the carriers $f_{NB}$ transmitted in $NC_{NB,2}=3$ interfering cells $C_{NB}$ on the level $L_2$. The class $CP_3$ comprises $NSP_{NB,2}=3$ subcarriers $f_{BB}$ each having a frequency band $\delta f_{BB}$ which is covered at least partially by the frequency band $\delta f_{NB}$ of at least one of the carriers $f_{NB}$ transmitted in $NC_{NB,3}=4$ interfering cells $C_{NB}$ on the level $L_3$. The class $CP_4$ comprises $NSP_{NB,4}=4$ subcarriers $f_{BB}$ among the $NC - NGf_{NB} = 19 - 12 = 7$ remaining cells $C_{NB}$ considered non-interfering in the pattern centred on the given cell $C_{BB,nc}$.

In practice, for an initial carrier to interference ratio $(C/I)_{NB\_BB,I} = -3$ dB, the overall carrier to interference ratio in a base station of the broadband network $R_{BB}$ collocated with the narrowband network $R_{NB}$ is of the order of $-6$ dB to $-8$ dB.

Figure 9:
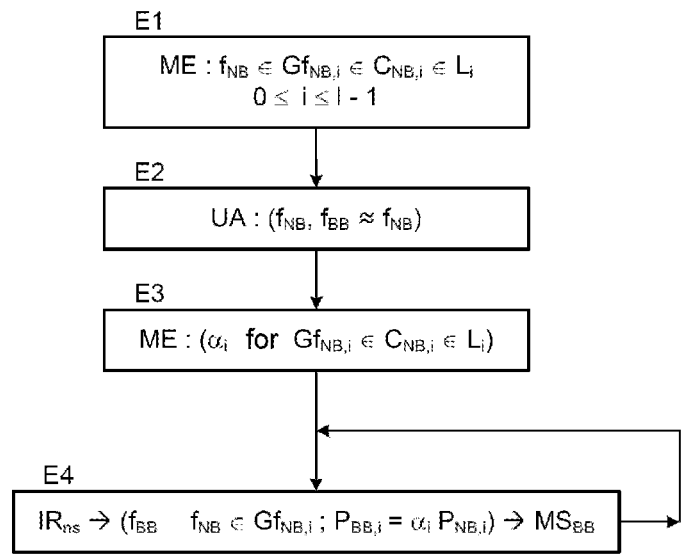
FIG. 9 shows an algorithm of the method for adapting transmission powers of subcarriers in a base station of the broadband network as a function of the carrier transmission power in the base stations of the narrowband network, according to a first embodiment.

According to a first embodiment of the invention, the method for adapting subcarrier powers comprises prior steps E1 to E3 and a repetitive step E4 which are shown in FIG. 9. These steps are executed in a base station $BS_{BB,nc}$ of a given cell $C_{BB,nc}$ of the broadband network $R_{BB}$ and for a specified sector $S_{ns}$ of the base station $BS_{BB,nc}$. The method is likewise executed in a similar manner for each of the sectors of each of the base stations of the broadband network.

Figure 10:
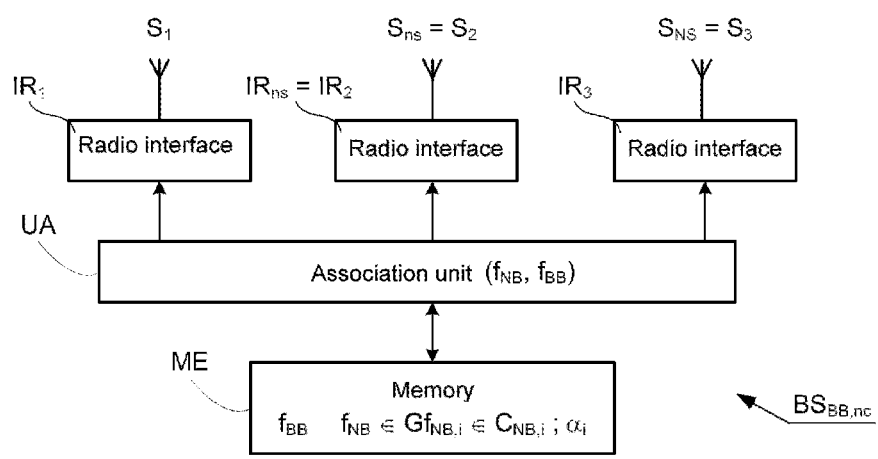
FIG. 10 shows a schematic block diagram of a base station of the broadband network according to the invention for the implementation of the first embodiment of the method.

For this first embodiment of the invention, a base station $BS_{BB,nc}$ of the broadband network $R_{BB}$ comprises in particular NS radio interfaces $IR_{ns}$ for the sectors $S_{ns}$ each having a transmitter/receiver in particular in order to transmit subcarriers $f_{BB}$ in the wide frequency band $\Delta F_{DL}$ for downlinks and to receive subcarriers in the wide frequency band $\Delta F_{UL}$ for uplinks, a programmable memory ME, and a unit for association of carriers and subcarriers UA, as shown in FIG. 10. In the base station $BS_{BB,nc}$ shown in FIG. 10, or in FIG. 13 described below, only functional blocks which ensure functions having a link with the invention are shown. Some of these functional blocks may correspond to computer program modules implemented in at least one processor and/or on dedicated or programmable hardware modules.

In the step E1, in the memory ME of the base station $BS_{BB,nc}$ are recorded groups $Gf_{NB,i}$ of transmission carriers $f_{NB}$ allocated to base stations $BS_{NB}$ in preselected cells $C_{NB,i}$ located on the cellular levels $L_i$, with $0 \le i \le I-1=3$, considering the levels according to their rank increasing from the cell $C_{BB}$ including the base station $BS_{BB,nc}$ to the first level $L_0$. As shown in FIG. 8 for example for the base station $BS_{BB,nc} = BS_{BB,1}$ located in the given cell $C_{BB,nc} = C_{BB,1}$ of a pattern $MC_{NB}$ of the narrowband network $R_{NB}$, the cell $C_{BB,1}$, the cells $C_{NB,2}$ and $C_{NB,7}$, the cells $C_{NB,9}$, $C_{NB,8}$ and $C_{NB,19}$, and at least the cells $C_{NB,14}$ and $C_{NB,15}$ are preselected respectively on the cellular levels $L_0$ to $L_3$. The carriers $f_{NB}$ of the groups $Gf_{NB,i}$ allocated to the preselected cells $C_{NB,i}$ are likely to interfere with carriers $f_{BB}$ transmitted by the base station $BS_{BB,nc}$ in the sector $S_{ns}$. The recording of the transmission carriers $f_{NB}$ makes it possible to pair them automatically with transmission subcarriers $f_{BB}$ of the base station $BS_{BB,nc}$ in the following step E2 and thus to adapt the transmission in the sectors of the broadband network to the transmission in the cells of the narrowband network when the carriers of the narrowband network are modified.

In the step E2, the unit for association of carriers and subcarriers UA in the base station $BS_{BB,nc}$ associates each carrier $f_{NB}$ allocated to a preselected cell $C_{NB,i}$ with a transmission subcarrier $f_{BB}$ of the base station $BS_{BB,nc}$, when it exists, which is close to the carrier $f_{NB}$, in order to form a pair of carrier and subcarrier $(f_{NB}, f_{BB})$ which is recorded in the memory ME. A transmission subcarrier $f_{BB}$ is said to be close to a carrier $f_{NB}$ for example if the bandwidth $\delta f_{BB}$ of the transmission subcarrier $f_{BB}$ contains at least the carrier $f_{NB}$ and therefore at least the useful half-band of the carrier $f_{NB}$. According to this example, for steps of $\delta f_{NB}=10$ kHz and $\delta f_{BB}=15$ kHz $> \delta f_{NB}$, the useful band of a carrier $f_{NB}$ is 8 kHz, and a subcarrier $f_{BB}$ is associated with the carrier $f_{NB}$ if the band $(f_{BB} - \delta f_{BB}/2, f_{BB} + \delta f_{BB}/2)$ contains at least the useful half-band $(f_{NB} - 4\text{ kHz}, f_{NB})$ or $(f_{NB}, f_{NB} + 4\text{ kHz})$. As a function of the ratio of frequency steps $\delta f_{NB}/\delta f_{BB}$, one or several subcarriers $f_{BB}$ are associated with the carrier $f_{NB}$. The transmission subcarriers $f_{BB}$ paired with transmission carriers $f_{NB}$ of preselected base stations $BS_{NB,i}$ located on the level $L_i$ are arranged in a respective group $Gf_{NB,i}$.

In the step E3, predetermined attenuation parameters $\alpha_i$ with $0 \le i \le I-1=3$ such as $\alpha_0 < \alpha_1 < \alpha_2 < \alpha_3$ are pre-recorded in association respectively with the cellular levels $L_i$ and the groups $Gf_{NB,i}$ in the memory ME. The attenuation parameters $\alpha_i$ satisfy the relationship (1) for a predetermined attenuation in the base stations $BS_{NB}$ of the narrowband network. The relationship of proportionality (2) is preferably satisfied for all the parameters $\alpha_0$ to $\alpha_3$. In this case, one of the parameters $\alpha_0$ to $\alpha_3$, for example the parameter $\alpha_0$, is fixed at a predetermined value and all the other attenuation parameters are deduced according to the relationship (2): $\alpha_i = \alpha_0 \ D_i^\gamma / D_{NB}^\gamma$ for i=1, 2 and 3. The choice of the attenuation parameter $\alpha_0$ with the index i=0 is arbitrary and any other attenuation parameter can be chosen as a predetermined value in order to determine the other attenuation parameters according to the preceding relationship.

Figure 11:
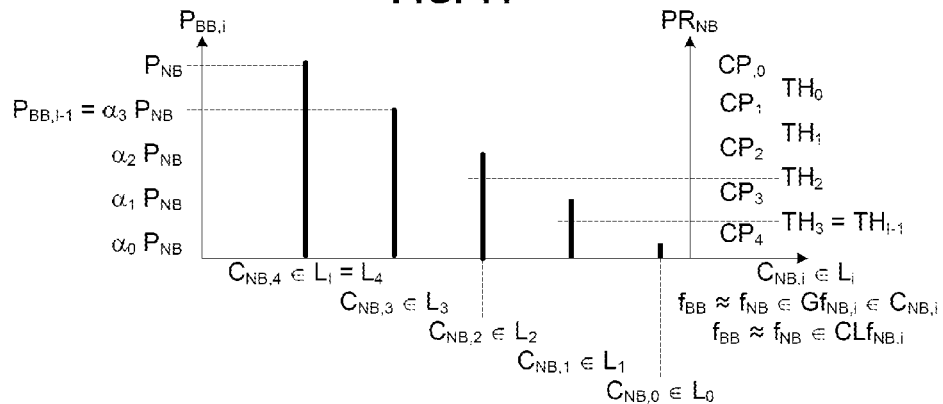
FIG. 11 shows a diagram in cellular level and power of the transmission powers from a sector of a base station of the broadband network as a function of the reception powers in the cell including this base station, for groups of carriers allocated to base stations in preselected cells of the narrowband network on cellular levels in the sector.

In the step E4, when as a function of the signalling and traffic data, the radio interface $IR_{ns}$ for the specified sector $S_{ns}$ of the base station $BS_{BB,nc}$ should transmit a transmission subcarrier $f_{BB}$ paired with a carrier $f_{NB}$ of the group $Gf_{NB,i}$ for the cellular level $L_i$ in the memory ME, the subcarrier transmission power $P_{NB}$, which is provided initially for each subcarrier $f_{BB}$ not interfering with the narrowband network, is attenuated by the predetermined attenuation parameter $\alpha_i$. The transmission subcarrier or subcarriers $f_{BB}$ paired with the carrier $f_{NB}$ of the group $Gf_{NB,i}$ are to be transmitted with a transmission power $P_{BB,i} = \alpha_i P_{NB}$. The predetermined attenuation parameter $\alpha_i$ has a fixed value and is used in order to attenuate the transmission powers $P_{NB}$ of all the subcarriers $f_{BB}$ belonging to the group $Gf_{NB,i}$. Transmission subcarriers $f_{BB}$ which do not belong to any of the groups $Gf_{NB,i}$ associated with the levels $L_i$ with $0 \leq i \leq I-1=3$ and therefore belonging to the group $Gf_{NB,I}$ are considered as not interfering with any transmission in cells $C_{NB}$ and are transmitted with the initial carrier transmission power $P_{NB}$. FIG. 11 shows schematically power transmitted for subcarriers $f_{BB}$ belonging to the various groups $Gf_{NB,0}$ to $Gf_{NB,4}$.

Then the step E4 is reiterated each time that a subcarrier $f_{BB}$ is to be transmitted towards mobiles $MS_{BB}$ tied to the base station $BS_{BB}$.

With reference now to FIG. 12, the method for adapting subcarrier powers according to a second embodiment of the invention comprises prior steps E10 to E12 and repetitive steps E13 to E16 in particular for dynamically classifying the carriers $f_{NB}$. These steps are executed in a base station $BS_{BB,nc}$ of a given cell $C_{BB,nc}$ of the broadband network $R_{BB}$ and for a specified sector $S_{ns}$ of the base station $BS_{BB,nc}$, and in a measurement mobile $MM_{BB,nc}$ situated substantially at the periphery and on the bisector $B_{ns}$ of the sector $S_{ns}$ of the given cell $C_{BB,nc}$, as shown in FIGS. 5 and 8. The method is likewise executed in a similar manner for each of the sectors of each of the base stations of the broadband network.

For the second embodiment, a base station $BS_{BB}$ of the broadband network $R_{BB}$ comprises in particular NS radio interfaces $IR_{ns}$ for the sectors $S_{ns}$ each having a transmitter/receiver in particular in order to transmit subcarriers $f_{BB}$ in the wide frequency band $\Delta F_{DL}$ for downlinks and to receive subcarriers in the wide frequency band $\Delta F_{UL}$ for uplinks, a memory ME, and a unit for classification of reception power UCP, as shown in FIG. 13. The radio interface in the measurement mobile $MM_{BB,nc}$ has stored the frequencies of the carriers $f_{NB}$ and is capable of detecting the carriers $f_{NB}$ in the wide frequency band $\Delta F_{DL}$ and transmitting measurements of reception power of the detected carriers $f_{NB}$ in the wide frequency band $\Delta F_{UL}$.

Previously, in the step E10, in the memory ME of the base station $BS_{BB}$ and in the measurement mobile $MM_{BB\ nc}$ are recorded groups $Gf_{NB,i}$ of transmission carriers $f_{NB}$ allocated to base stations $BS_{NB,nc}$ in preselected cells $C_{NB,i}$ located on the cellular levels $L_i$, with $0 \leq i \leq I-1=3$, considering the levels according to their rank increasing from the cell $C_{BB,nc}$ including the base station $BS_{BB,nc}$ to the first level $L_0$, as in the step E1.

In the step E11, the unit for association of carriers and subcarriers UA in the base station $BS_{BB,nc}$ forms pairs ($f_{NB}$, $f_{BB}$) which associate the carriers $f_{NB}$ of groups allocated to the preselected cells $C_{NB,i}$ respectively with adjacent transmission subcarriers $f_{BB}$ of the base station $BS_{BB,nc}$, as in the step E2. The bandwidth $\delta f_{NB}$ of the carrier $f_{NB}$ of a pair contains for example at least the subcarrier $f_{BB}$ of the pair and therefore at least the useful half-band of the carrier $f_{BB}$. According to an example for which $\delta f_{NB}$=25 kHz and $\delta f_{BB}$=15 kHz<$\delta f_{NB}$, the useful band of a carrier $f_{NB}$ is 22 kHz, and two subcarriers $f_{BB}$ are paired with the carrier $f_{NB}$ if the useful band ($f_{NB}$−11 kHz, $f_{NB}$+11 kHz) contains at least the half-band ($f_{BB} - \delta f_{BB}/2$, $f_{BB}$) ou ($f_{BB}$, $f_{BB} + \delta f_{BB}/2$) of each of the two sub-carriers $f_{BB}$. As a function of the ratio of frequency steps $\delta f_{NB}/\delta f_{BB}$, one or several subcarriers $f_{BB}$ are associated with the carrier $f_{NB}$.

In the step E12, predetermined reception power thresholds $TH_i$ with $0 \leq i \leq I-1=3$ such as $TH_0 > TH_1 > TH_2 > TH_3 \cong 0$ are recorded in association respectively with predetermined attenuation parameters $\alpha_i$ such as $\alpha_0 < \alpha_1 < \alpha_2 < \alpha_3$ in the memory ME. Each predetermined power threshold $TH_i$ is intended to be associated with measured reception powers $PR_{NB}$ comprised between this threshold $TH_i$ and the preceding threshold $TH_{i-1}$ and must correspond to carriers $f_{NB}$ transmitted by base stations $BS_{NB}$ on the level $L_i$. The threshold $TH_0$ is associated with high measured reception powers which must correspond to carriers $f_{NB}$ transmitted by the base station $BS_{NB,nc}$ on the level $L_0$.

After the initial steps E10 to E12, the following steps are executed periodically.

In the step E13, the radio interface of the measurement mobile $MM_{BB,nc}$ detects by filtering carriers $f_{NB}$ transmitted by the network $R_{NB}$ corresponding to the sub-carriers $f_{NB}$ allocated to base stations $BS_{NB,nc}$ in preselected cells $C_{NB,i}$ located on the cellular levels $L_i$, with $0 \leq i \leq I-1=3$, and measures the reception powers $PR_{NB}$ of the detected carriers $f_{NB}$. The measured reception power of each carrier detected can result from an average of reception powers measured during a predetermined period in such a way as to smooth the powers measured as a function of the variation of the propagation environment in the networks due in particular to various mobilities and in particular fading and the effects of shadowing. For example, for each group of carriers allocated to a preselected cell $C_{NB,i}$, such as those shown hatched in FIG. 8, the measurement mobile $MM_{BB,nc}$ detects the carrier of this group supporting a time division multiplex control channel with traffic routes and transmitted permanently by the base station $BS_{NB,i}$ of the preselected cell $C_{NB}$, and measures the reception power $PR_{NB}$ of the control channel as reception power for any carrier $f_{NB}$ transmitted by the base station $BS_{NB,i}$.

In the step E14, the measurement mobile $MM_{BB\ nc}$ transmits the measured reception powers $PR_{NB}$ in association respectively with the detected carriers $f_{NB}$ to the base station $BS_{BB,nc}$. The pairs of measured power and carrier ($PR_{NB}$; $f_{NB}$) are transmitted in a reliable manner, for example according to an automatic request repetition procedure HARQ (Hybrid Automatic Repeat reQuest) and through spatio-temporal converters to several MIMO (multiple input multiple output) antenna ports, from the measurement mobile $MM_{BB,nc}$ towards the base station $BS_{BB,nc}$.

In the step E15, the measured reception powers $PR_{NB}$ received by the base station $BS_{BB,nc}$ are compared with the reception power thresholds $TH_0$ to $TH_{I-1}$ in the power classification unit UCP. The UCP unit classifies the measured reception powers $PR_{NB}$ in association respectively with the carriers $f_{NB}$ detected by classes of power $CP_i$. A detected carrier $f_{NB}$ belongs to the class $CP_i$ if the measured power $PR_{NB}$ thereof is such that $TH_{i-1} > PR_{NB} \geq TH_i$. The carriers $f_{NB}$ of which the measured powers are higher than the threshold $TH_0$ are classified in the class $CP_0$ corresponding to the level $L_0$. The carriers $f_{NB}$ of which the measured powers are lower than the threshold $TH_3$ are classified in a class $CP_4$ corresponding to levels $L_I = L_4$ on which the base stations $BS_{NB}$ are situated beyond the level $L_3$ and are not interfered with by the carriers transmitted by the base station $BS_{BB,nc}$ in the given cell $C_{BB,nc}$.

In the step E16, when as a function of the signalling and traffic data, the radio interface $IR_{ns}$ for the specified sector $S_{ns}$ of the base station $BS_{BB,i}$ should transmit a transmission subcarrier $f_{BB}$ associated with a carrier $f_{NB}$ of the power class $CP_i$ in the memory ME, the transmission power $P_{NB}$, which is provided initially for each subcarrier $f_{BB}$ not interfering with the narrowband network, is attenuated by the associated attenuation parameter a read in the memory ME. The attenuation parameter $\alpha_i$ has a fixed value and is used in order to attenuate the transmission powers of all the subcarriers $f_{BB}$ belonging to the class $CP_i$. Transmission subcarriers $f_{BB}$ which do not belong to any of the classes $CP_i$ associated with the levels $L_i$ with $0 \leq i \leq I-1=3$ and therefore belonging to the class $CP_4$ are considered as not interfering with any transmission in cells $C_{NB}$ and are transmitted with the initial transmission power $P_{NB}$. FIG. 11 shows schematically the measured reception powers $PR_{NB}$ compared with the transmitted power $P_{BB,i} = \alpha_i P_{NB}$ for transmission subcarriers $f_{BB}$ associated with the various classes $CP_0$ to $CP_4$.

Then the steps E13 to E16 are reiterated each time that a subcarrier $f_{BB}$ is to be transmitted towards mobiles $MS_{BB}$ tied to the base station $BS_{BB}$.

According to a variant of the second embodiment, for each detected carrier of each group allocated to a preselected cell $C_{NB,i}$, the measurement mobile $MM_{BB,nc}$ measures the average reception power of active time division multiplex traffic routes in a frame supported by the detected carrier $f_{NB}$. The transmission powers of the subcarriers $f_{BB}$ in the base station $BS_{BB,nc}$ of the given cell $C_{BB,nc}$ are then adapted automatically in order to minimise the interference on the traffic load of the narrowband network $R_{NB}$. If the number of active carriers $f_{NB}$ in the base stations $BS_{NB}$ of the preselected cells $C_{NB,i}$ is high, the transmission capacity of the base stations $BS_{BB}$ is reduced. On the other hand, if the traffic in the narrowband network $R_{NB}$ is low, which means that numerous carriers $f_{NB}$ are inactive and numerous measured reception powers $PR_{NB}$ are zero, the transmission capacity of the base stations $BS_{BB}$ is increased.

According to another variant of the second embodiment, the number of powers to be compared with the thresholds $TH_0$ to $TH_{I-1}$ is reduced in the step E15. The power classification unit UCP in the base station $BS_{BB,nc}$ of the given cell establishes in the step E15 for each unit of carriers allocated to a preselected cell $C_{NB,i}$, the average of the reception powers $PR_{NB}$ measured for all the carriers $f_{NB}$ belonging to this group. For example, for each group the measurement mobile $MM_{BB,nc}$ detects the carrier of this group supporting a time division multiplex control channel with traffic routes and transmitted permanently by the base station in the preselected cell $C_{NB,i}$, and measures the reception power $PR_{NB}$ of the control channel as average reception power for all the carriers $f_{NB}$ transmitted by the base station in the cell $C_{NB,i}$. The UCP unit compares the average power of the group to the thresholds $TH_0$ to $TH_{I-1}$ in order that the transmission powers of all the subcarriers $f_{BB}$ adjacent to the carriers $f_{NB}$ belonging to the group may be attenuated with the same predetermined attenuation parameter $\alpha_i$.

According to yet another variant, the step E13 of measurement of the reception powers $PR_{NB}$ of detected carriers $f_{NB}$ is carried out at any measurement point situated in the given cell $C_{BB,nc}$ and in the specified sector $S_{ns}$. This point may be on the base station $BS_{BB,nc}$ in the given cell $C_{BB,nc}$. In this case, all the steps E10 to E16 are executed in the base station $BS_{BB,nc}$ without using a measurement mobile $MM_{BB,nc}$. The specified base station $BS_{BB,nc}$ itself detects carriers $f_{NB}$ transmitted in the preselected cells located in the specified sector $S_{ns}$ and measures the reception powers of these carriers $f_{NB}$.

According to other embodiments, the method is applied in a similar manner in the other direction of transmission relating to uplinks from a mobile $MS_{BB}$ towards a base station $BS_{BB}$ in a given cell for subcarriers included in the frequency band $\Delta F_{UL}$ for uplinks common to the networks $R_{NB}$ and $R_{BB}$.

In this case, the steps of the method, which were executed in a base station $BS_{BB}$ of the broadband network $R_{BB}$ according to the first embodiment of the invention, are executed at the transmission for uplinks in each mobile $MS_{BB}$ tied to a base station $BS_{BB}$ located in a given cell in such a way as to adapt the transmission powers of the subcarriers to be transmitted by the mobile $MS_{BB}$ to transmission powers of other carriers included in the frequency band $\Delta F_{UL}$ and capable of being transmitted by mobiles $MS_{NB}$ in the narrowband network which are located in preselected cells associated with the specified sector of the given cell.

In particular, all the steps E1 to E4 or E10 to E16 of the method according to the invention may be executed in each mobile $MS_{BB}$.

The invention described concerns a method and a transmitter/receiver as base station or mobile for adapting the subcarrier powers transmitted in a predetermined transmission direction in a broadband cellular wireless communication network as a function of the carrier powers transmitted in the broad band in the predetermined transmission direction in a narrowband cellular wireless communication network collocated with the broadband network. According to one implementation, steps of the method according to the invention are specified by the instructions of a computer program incorporated in the transmitter/receiver. The program capable of being carried out in the transmitter/receiver according to the invention includes program instructions which, when said program is executed in the transmitter/receiver of which the operation is then controlled by the execution of the program, carry out steps of the method according to the invention.

Consequently the invention likewise applies to a computer program, in particular a computer program recorded on or in a computer-readable recording medium and any data processing device suitable for implementing the invention. This program can use any programming language, and may be in the form of a source code, object code or intermediate code between source code and object code such as a partially compiled form, or in any other desirable form in order to implement the method according to the invention. The program can be downloaded in the base station via a communication network, such as the internet.

The recording medium can be any entity or device capable of storing the program. For example, the medium can include a storage means on which the computer program according to the invention is recorded, such as a ROM, for example a CD ROM or a ROM of a microelectronic circuit, or also a USB stick, or a magnetic recording mean, for example a diskette (floppy disc) or a hard disk.

The invention claimed is:
1. A method for adapting subcarrier powers in a first cellular wireless communication network having first base stations with several directional sectors as a function of the powers of carriers in a second cellular wireless communication network with a narrow band having second omnidirectional base stations, the first and the second network each having first and second collocated base stations in common cells and a wide frequency band including the subcarriers allocated to the sectors of the first base stations ($BS_{BB}$) and groups of carriers allocated respectively to the second base stations in a cellular pattern of re-use of the second network having several concentric levels of cell location encircling a given cell ($L_0$ à $L_{I-1}$), the method comprising: attenuating by an attenuation parameter ($\alpha_i$) a predetermined power for each subcarrier which is to be transmitted by a transmitter/receiver of the first network located in the given cell and in a specified sector of the given cell and which is adjacent to a carrier belonging to one of the groups allocated to second base stations in preselected cells in the specified sector and on the concentric levels starting from the given cell below a predetermined high concentric level, wherein the attenuation parameter is lower in value as the respective concentric level of the concentric levels is located closer to the given cell, and transmitting the subcarriers other than said adjacent subcarriers with the predetermined transmission power in the specified sector by the transmitter/receiver.

2. The method according to claim 1, further comprising measuring reception powers of the carriers of the groups allocated to the second base stations of the preselected cells in the specified sector of the given cell at a point situated in the given cell and in the specified sector, and classifying the carriers into classes associated respectively with the levels, with the attenuation parameters and with thresholds which are all the more low as the associated levels are distanced from the given cell, the carriers in a class having reception powers comprised between the threshold associated with the class and the preceding threshold, the predetermined power for a subcarrier which is to be transmitted by the transmitter/receiver being attenuated by an attenuation parameter when the subcarrier is adjacent to a carrier belonging to the class associated with the attenuation parameter.

3. The method according to claim 2, according to which the measured reception power of a carrier is the average reception power of active traffic routes supported by the carrier.

4. The method according to claim 2, wherein the measured reception power of each carrier of a group allocated to a second base station of a preselected cell in the specified sector is the average of the measured reception powers for all the carriers belonging to the group.

5. The method according to claim 2, wherein the measured reception power of each carrier of a group allocated to a second base station of a preselected cell in the specified sector is the reception power of a control channel supported by one of the carriers of the group.

6. The method according to claim 1, wherein the attenuation parameters depend upon a target attenuation parameter of the carrier to interference ratio at the reception of carriers in a transmitter/receiver located in a cell of the second network.

7. The method according to claim 6, wherein the attenuation parameter for a subcarrier adjacent to a carrier belonging to a group allocated to second base stations in preselected cells located on a respective level is $\alpha_i = k\ D_i^\gamma/D_{NB}^\gamma$, and wherein k is a factor which is a function of the target attenuation parameter and of numbers of preselected cells located respectively on the levels lower than the predetermined high level starting from the given cell, and wherein $D_i$, is an average distance between a first base station and points of the preselected cells on the respective level which are furthest from the given cell, and wherein $D_{NB}$ is the distance of re-use of the cellular pattern of the second network, and wherein $\gamma$ is a propagation constant in the networks.

8. The method according to claim 1, wherein the numbers of preselected cells in the specified sector on the levels starting from the given cell are respectively equal at most to the ranks of levels counted from the given cell to the level lower than the predetermined high level, all of the preselected cells on a level being symmetrical relative to the bisector of the specified sector.

9. The method according to claim 1, wherein a number of levels lower than the high level is greater than 2, and the attenuation parameters are zero for subcarriers adjacent to carriers belonging to groups allocated to second base stations in preselected cells in the specified sector which are situated on at least one of the two first levels.

10. A transmitter/receiver configured for location in a given cell of a first cellular wireless communication network in order to adapt the transmission powers of subcarriers as a function of the transmission powers of carriers in a second cellular wireless communication network with a narrow band, the first and the second network each having in common cells, collocated, a first base station with several directional sectors of the first network and a second omnidirectional base station of the second network and a wide frequency band including the subcarriers allocated to the sectors of the first base stations and the groups of carriers allocated respectively to the second base stations in a cellular pattern of re-use ($MC_{NB}$) of the second network having several concentric levels of cell location encircling the given cell, the transmitter/receiver comprising: means for attenuating by an attenuation parameter a predetermined power of each subcarrier which is to be transmitted in a specified sector of the given cell and which is adjacent to a carrier belonging to one of the groups allocated to second base stations in preselected cells in the specified sector and on concentric levels starting from the given cell below a predetermined high concentric level, the attenuation parameter is lower in value as the respective concentric level of the concentric levels is located closer to the given cell, and means for transmitting the subcarriers in the specified sector with the predetermined transmission power other than said adjacent subcarriers.

11. A broadband wireless communication network comprising, a plurality of base stations in a first network, with a plurality of directional sectors as transmitter/receivers, the transmitter/receivers being configured to transmit subcarriers disposed in a wide frequency band including the subcarriers allocated to sectors of the base stations in the first network and groups of carriers allocated respectively to base stations of second network in a cellular pattern of re-use of the second network having several concentric levels of cell location encircling a given cell dedicated to downlinks and having transmission powers to adapt to the transmission powers of carriers included in the frequency band dedicated to the downlinks and capable of being transmitted by omnidirectional base stations ($BS_{NB}$) in a narrowband wireless communication network; a plurality of mobile devices in the second network collocated with the broadband network and the first and the second network each having first and second collocated base stations in common cells, the mobile devices acting as transmitter/receivers configured to transmit other subcarriers disposed within a frequency band dedicated to uplinks and having transmission powers to adapt to the transmission powers of other carriers included in the frequency band dedicated to the uplinks and capable of being transmitted by mobiles in the narrowband network, each of the transmitter/receivers comprising: means for attenuating by an attenuation parameter a predetermined power of each subcarrier which is to be transmitted in a specified sector of the given cell and which is adjacent to a carrier belonging to one of the groups allocated to second base stations in preselected cells ($C_{NB,i}$) in the specified sector ($S_{ns}$) and on the concentric levels starting from the given cell below a predetermined high concentric level ($L_I$), wherein the attenuation parameter is lower in value as the respective concentric level of the concentric levels is located closer to the given cell, and means ($IR_{ns}$) for transmitting the subcarriers in the specified sector with the predetermined transmission power other than said adjacent subcarriers.

12. A computer program product disposed in a non-transitory computer readable storage medium, the non-transitory computer readable storage medium being implemented in a transmitter/receiver said program product being characterised in that it comprises instructions which, when executed in the transmitter/receiver, performs the steps of: adapting subcarrier powers in a first cellular wireless communication network having first base stations with several directional sectors as a function of powers of carriers in a second cellular wireless communication network with a narrow band having second omnidirectional base stations, first and second network each having first and second collocated base stations in common cells and a wide frequency band including the subcarriers allocated to sectors of the first base stations and groups of carriers allocated respectively to the second base stations in a cellular pattern of re-use of the second network having several concentric levels of cell location encircling a given cell, the steps comprising: attenuating by an attenuation parameter a pre-determined power for each subcarrier which is to be transmitted by a transmitter/receiver of a first network located in the given cell and in a specified sector of the given cell and which is adjacent to a carrier belonging to a group allocated to a plurality of the second base stations in preselected cells in the specified sector and on the concentric levels starting from the given cell below a predetermined high concentric level, wherein the attenuation parameter is lower in value as the respective concentric level of the concentric levels is closer to the given cell, and transmitting the subcarriers other than said adjacent subcarrier with the predetermined transmission power in the specified sector by the transmitter/receiver.

* * * * *